US00RE39842E

(19) United States
(12) Reissued Patent
Purvis et al.

(10) Patent Number: US RE39,842 E
(45) Date of Reissued Patent: Sep. 18, 2007

(54) TEMPORARY GUARD RAIL SYSTEM

(76) Inventors: Harrison G. Purvis, 130 N. Middleton St., Robbins, NC (US) 27326; Lonnie E. Arnold, 677 Revels Rd., Fuquay-Varina, NC (US) 27526; Tony R. Matthews, 196 Old Buies Creek Rd., Lillington, NC (US) 27526

(21) Appl. No.: 09/703,277

(22) Filed: Oct. 31, 2000

Related U.S. Patent Documents

Reissue of:
(64) Patent No.: 5,842,685
Issued: Dec. 1, 1998
Appl. No.: 08/620,211
Filed: Mar. 29, 1996

U.S. Applications:
(63) Continuation-in-part of application No. 08/421,858, filed on Apr. 14, 1995, now abandoned.

(51) Int. Cl.
*E04H 17/14* (2006.01)

(52) U.S. Cl. ..... 256/67; 256/59; 256/DIG. 6; 182/113

(58) Field of Classification Search ..... 182/45, 182/113; 256/59, 65, 67, DIG. 5, DIG. 6; 403/109; 248/156
See application file for complete search history.

(56) References Cited

U.S. PATENT DOCUMENTS

| | | | | |
|---|---|---|---|---|
| 789,242 A | | 5/1905 | Stewart, Jr. | 256/65 |
| RE20,653 E | | 2/1938 | Lamb | 182/113 |
| 2,136,696 A | | 11/1938 | Lamb | 182/113 |
| 2,910,135 A | | 10/1959 | Moore | 182/113 |
| 3,278,164 A | | 10/1966 | Leyendecker | 256/24 |
| 3,351,311 A | | 11/1967 | Melfi | 248/231.71 |
| 3,370,836 A | | 2/1968 | Ashworth et al. | 256/65 X |
| 3,382,949 A | | 5/1968 | Bloch | 182/113 |
| 3,480,257 A | | 11/1969 | Bourn et al. | 183/113 |
| 3,524,627 A | | 8/1970 | Boyanton et al. | 256/65 |
| 3,648,982 A | | 3/1972 | Sabel et al. | 256/65 |
| 3,662,993 A | | 5/1972 | Lionetto | 256/59 X |
| 3,733,054 A | | 5/1973 | Storch | 256/59 |
| 3,757,894 A | * | 9/1973 | Chamberlin | 182/106 |
| 3,776,521 A | | 12/1973 | Weinert | 256/59 X |

(Continued)

FOREIGN PATENT DOCUMENTS

| | | | |
|---|---|---|---|
| FR | 1383061 | 11/1964 | 182/113 |
| FR | 2384918 | 11/1978 | 182/45 |
| FR | 2596441 | 2/1987 | 182/45 |
| JP | 406322920 | 11/1994 | 256/59 |

*Primary Examiner*—William L. Miller
(74) *Attorney, Agent, or Firm*—Allen, Dyer, Doppelt, Milbrath & Gilchrist, P.A.

(57) ABSTRACT

An improved temporary guard rail system for use by residential and commercial builders on construction sites in those areas of building structures where an accidental fall may result in serious bodily injury. In particular, the temporary guard rail system of the present invention includes a plurality of upright stanchions having mounting brackets integrally formed or attached thereto that are connected by a plurality of vertically spaced, generally horizontal side rails extending end to end. The vertically spaced side rails are adapted for 360 degree rotational movement in both horizontal and vertical planes. In addition, the tubular guard rails are fabricated in a plurality of sections that may be slideably engaged, one inside another, to provide a telescoping adjustment of length. The temporary guard rail system may be adapted and secured to various features of a building such as balconies, elevated platforms, stair cases, and the perimeter of a floor prior to the external walls or permanent protective railings being erected to prevent accidental injury. Further, the temporary guard rail system is designed and manufactured to conform to OSHA requirements for temporary guard rails. This system also provides a versatile safety device which is easy to install, ready to dismantle, and relatively inexpensive to manufacture.

23 Claims, 14 Drawing Sheets

U.S. PATENT DOCUMENTS

| | | | | | |
|---|---|---|---|---|---|
| 3,785,602 | A | | 1/1974 | Juculano | 182/113 X |
| 3,863,900 | A | | 2/1975 | Dagiel et al. | 256/59 |
| 3,880,405 | A | | 4/1975 | Brueske | 256/59 |
| 3,995,832 | A | * | 12/1976 | Wiese | 256/59 |
| 4,015,827 | A | * | 4/1977 | Brand | 256/59 |
| 4,150,907 | A | * | 4/1979 | Thurnauer | 403/234 |
| 4,351,469 | A | | 9/1982 | Newman | 256/65 X |
| 4,830,341 | A | | 5/1989 | Arteau et al. | 256/65 |
| 5,182,889 | A | | 2/1993 | Johnson | 52/298 |
| 5,188,342 | A | | 2/1993 | Quellette et al. | 256/59 X |
| 5,314,167 | A | | 5/1994 | Holloman | 256/69 |
| 5,431,372 | A | | 7/1995 | Kostelecky | 182/45 X |
| 5,452,880 | A | | 9/1995 | Bailey | 256/67 |
| 5,547,169 | A | | 8/1996 | Russell | 256/67 |
| 5,551,669 | A | | 9/1996 | Reinklou | 182/113 X |
| 5,645,271 | A | * | 7/1997 | Nunez | 256/67 |
| 5,683,074 | A | | 11/1997 | Purvis et al. | 256/67 |
| 5,842,685 | A | | 12/1998 | Purvis et al. | 256/67 |

* cited by examiner

TEMPORARY GUARD RAIL SYSTEM

Matter enclosed in heavy brackets [ ] appears in the original patent but forms no part of this reissue specification; matter printed in italics indicates the additions made by reissue.

This application is a Continuation-In-Part application of U.S. application Ser. No. 08/421,858 filed Apr. 14, 1995 by Harrison G. Purvis and Tony R. Matthews entitled Temporary Guard Rail System and Method of Using the Same now U.S. Pat. No. 5,683,074.

FIELD OF INVENTION

This invention relates to safety devices and more particularly to temporary guard rails used during construction of buildings.

BACKGROUND OF INVENTION

During the construction of buildings, both commercial and residential, there has been a problem in providing safety rails prior to permanent railings being installed on decks, balconies, and even elevated floors prior to the construction of exterior walls.

Quite often, 2×4 lumber has been temporarily nailed to form makeshift railings. Structures of this type, however, are usually not strong in structure and a worker or other person falling thereagainst can easily dislodge the makeshift railing causing such persons to fall. This of course can result in grievous injury or even death.

The above mentioned problems are of such a serious nature that the Occupational Hazards Safety Act, or OSHA agency has become so alarmed that regulations have been promulgated to require temporary railings on all open elevated building structures that will withstand at least two hundred pounds pressure without failing. No structure, however, has been detailed to meet these requirements.

CONCISE EXPLANATION OF PRIOR ART

U.S. Pat. No. 2,910,135 to William P. Moore discloses a ladder scaffold with a guard rail which includes an upwardly projecting bolt with a wing nut that secures a telescopically adjustable railing in position.

U.S. Pat. No. 5,314,167 to Jesse H. Holloman discloses a temporary rail structure design to be used around the floor of a building during the construction process.

U.S. Pat. No. 3,351,311 to Samuel T. Melfi discloses a support for guard rails including wing nuts that hold both the top rail and the intermediate rail in position. However, the intermediate rails are not adjustable.

U.S. Pat. No. 4,830,341 to Jean Arteau, et al. discloses an anchor for mounting a temporary safety fence to a floor of a building under construction.

U.S. Pat. No. 3,662,993 to Anthony Lionetto discloses a protective guard fixture for open work areas in building construction having two vertical posts which support a barrier frame member.

U.S. Pat. No. 5,182,889 to Dennis Johnson discloses a barrier system having a plurality of elongated rod members and bracket system for attachment of the barrier to a structure.

U.S. Pat. No. 3,733,054 to Bernard Storch discloses a safety fence including a plurality of posts having brackets and telescopic rails which are coupled to an supported by the brackets.

U.S. Pat. No. 3,863,900 to Richard T. Dagiel, et al. discloses a guard assembly including a stanchion bracket which is designed for removable attachment to the outer edge of a concrete floor in combination with similar stanchion brackets.

U.S. Pat. No. 4,015,827 to Harold E. Brand discloses a stanchion including a base secured to a building support having a tubular receptacle carried on the base and supported thereon by an angular gusset.

Finally, U.S. Pat. No. RE20,653 to Clyde K. Lamb is considered of general interest in that it discloses a guard rail for a scaffold having a plurality of posts adapted to be secured at one end of the scaffold and to extend vertically upwardly from the floor of the scaffold and the guard rail section supported between pairs of adjacent posts.

BRIEF DESCRIPTION OF INVENTION

After much research and study into the above mentioned problems, the present invention has been developed to provide a simple and yet highly efficient temporary railing system in accordance with OSHA requirements that can be readily installed when needed and just as readily removed when no longer required.

The present invention can be readily adapted to conform to varying building structure configurations. In particular, the temporary guard rail of the present invention includes a plurality of upright stanchions that are designed to be installed about the edge of a flat roof, an elevated platform, flight of stairs, or a floor area to support a plurality of vertically spaced, telescoping side railings.

Each of the upright stanchions of the temporary guard rail of the present invention include an anchor bracket integrally formed therewith for attaching the upright stanchions to the subfloor or framing members of the building under construction. The anchor brackets are provided with a plurality of mounting holes to permit the attachment of the same to the building structure with lag screws or other suitable fasteners. Typically, a pair or a series of these upright stanchions are attached to the subfloor in locations that present a potential for injury due to falls.

The individual stanchions are connected by upper and lower side rails which are pivotally mounted at a predetermined height on each upright stanchion. The pivoting side rail connectors with adapters permit the horizontal side rails to be rotated a full 360 degrees about the point of attachment on each upright stanchion either horizontally or at an angle. Thus, the guard rails may be adapted to virtually to any configuration encountered in a building under construction.

In view of the above, it is an object of the present invention to provide a temporary guard rail system that can be readily installed when needed and readily removed when no longer required.

Another object of the present invention is to provide a temporary guard rail system which may be readily adapted to virtually and configuration encountered in the building construction including roofs, elevated platforms, balconies, stairs, and the perimeter of the floor of the building prior to the construction of the exterior walls or permanent protective railings.

Another object of the present invention is to provide a temporary guard rail system which may be adapted for installation on soil or asphalt adjacent trenches or other excavations to prevent falls therein.

Another object of the present invention is to provide a temporary guard rail system that fully complies with the OSHA requirements for such temporary guard rails.

Other objects and advantages of the present invention will become apparent and obvious from a study of the following description and the accompanying drawings whcih are merely illustrative of such invention.

DETAILED DESCRIPTION OF INVENTION

Figure 1:
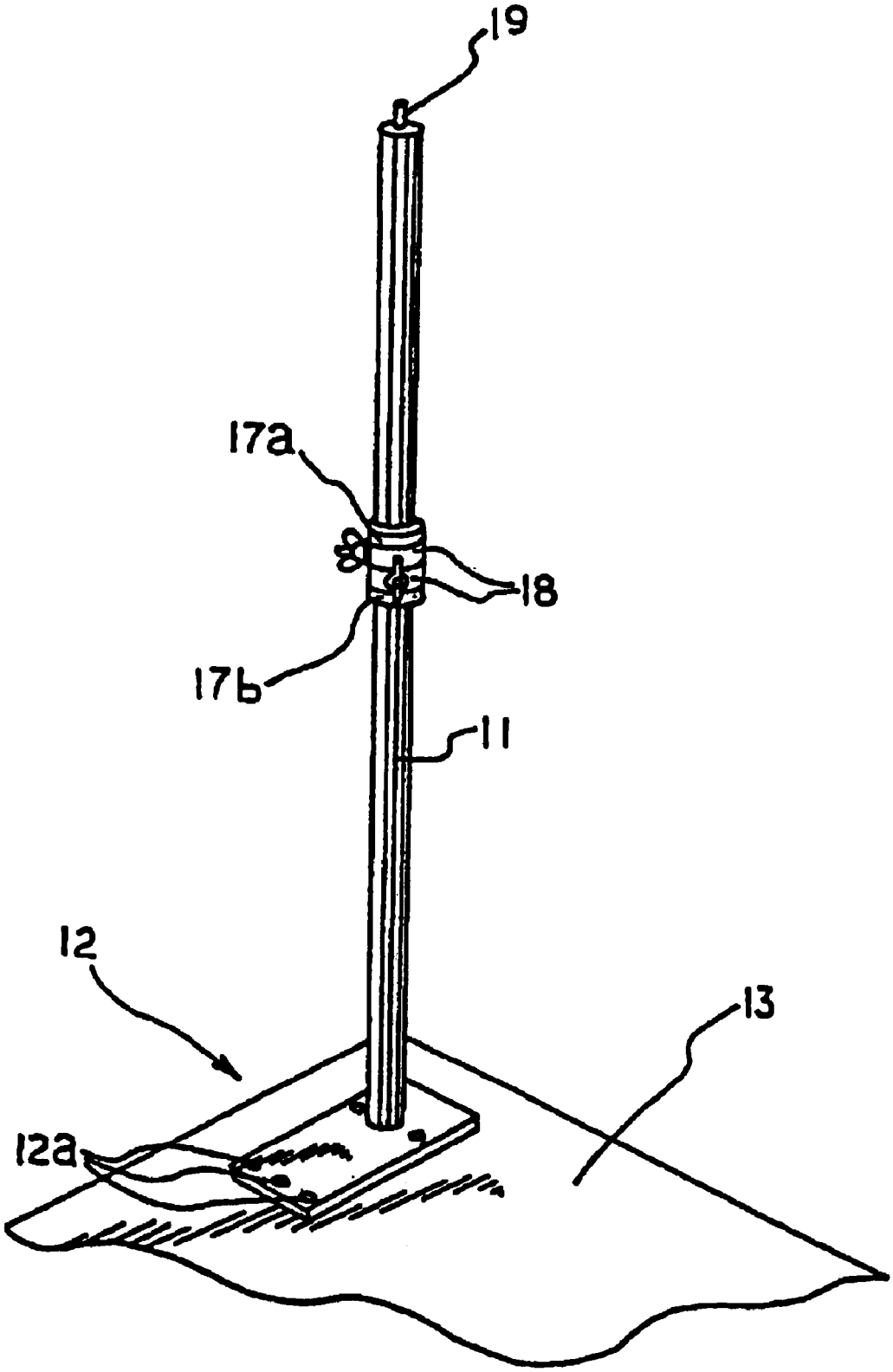
FIG. 1 is a perspective view of an upright stanchion that forms a part of the temporary guard rail system of the present invention.
Figure 2:
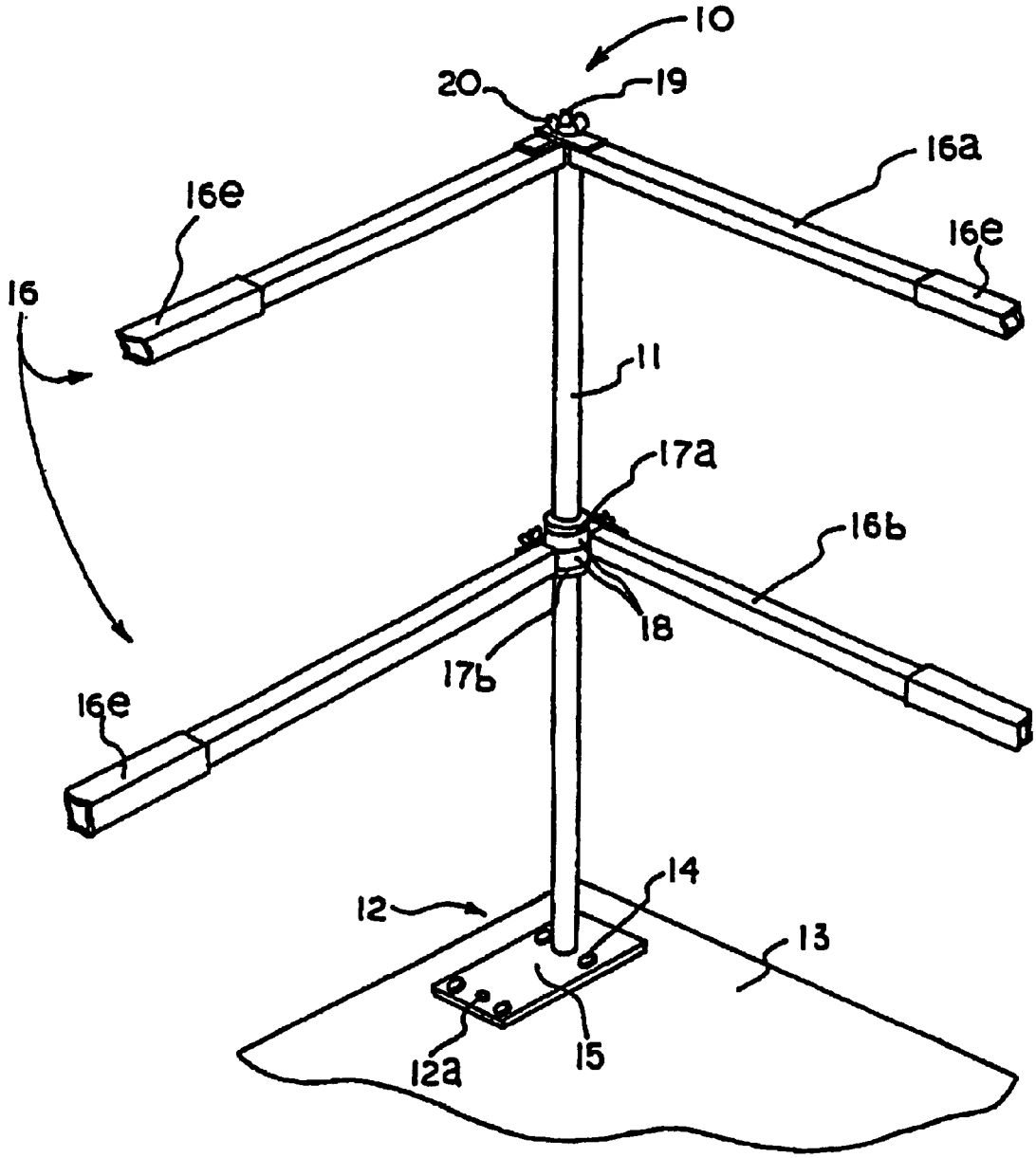
FIG. 2 is a perspective view of an upright stanchion showing sections of the telescoping, horizontal side rails mounted thereon and fastened to the floor of a structure.

With further reference to the drawings, the temporary guard rail system in accordance with the present invention is illustrated in FIG. 2 and indicted generally at 10. The temporary guard rail system 10 comprises a plurality of upright stanchions 11 as shown in FIG. 1. In the preferred embodiment, stanchions 11 are formed from solid steel bars in order to comply with OSHA strength regulations. However, it will be appreciated that other materials such as aluminum, fiberglass and similar composites may be utilized in alternative embodiments.

The lower end of each stanchion 11 has integrally formed therewith or otherwise fixed thereto as anchor bracket, indicated generally at 12, for attaching each stanchion 11 to the building subfloor 13 or other suitable forming members (not shown). In the preferred embodiment, stanchion 11 is positioned in a predetermined location on anchor bracket 12 and is attached in perpendicular relation thereto by weldment or other suitable means as illustrated in FIG. 1.

As shown in FIG. 1, anchor bracket 12 includes a plurality of mounting apertures 12a extending through the same in predetermined locations. Mounting apertures 12a each have a center axis that is disposed in perpendicular relation to the plane of anchor bracket 12.

Anchor bracket 12 may be securely attached to building subfloor 13 by installing a plurality of lag screws 14 or other suitable fasteners to secure stanchion 11 in position as illustrated in FIG. 2.

Figure 10:
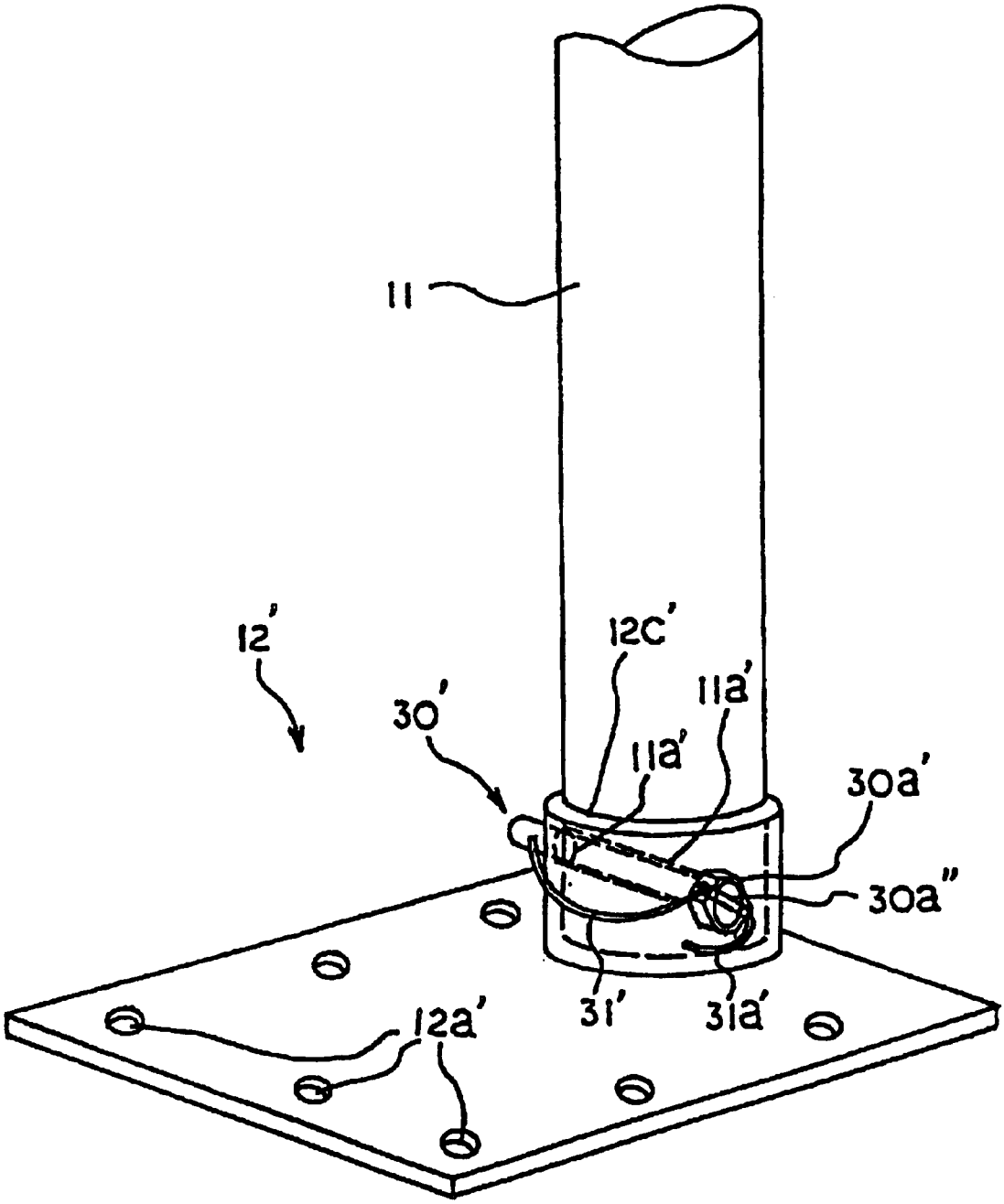
FIG. 10 is a perspective view of an alternative embodiment of the anchor bracket of the present invention.

Referring now to FIG. 10 there is shown therein an alternative embodiment of the anchor bracket, indicated generally at 12', for attaching each stanchion 11' to the building subfloor or other suitable framing members. In this embodiment anchor bracket 12' includes a cylindrical cup 12b' that is positioned in a predetermined location on anchor bracket 12' and is attached in perpendicular relation thereto by weldment or other suitable means.

Cup 12b' includes an internal bore 12c' having an inside diameter that is slightly larger than an outside diameter of stanchion 11'. Thus, cup 12b' is adapted to receive a lower end of stanchion 11' therein.

Stanchion 11' is provided with a cross-drilled hole 11 a' at the lower end thereof and in perpendicular relation to a longitudinal axis of stanchion 11'.

Similarly, cup 12b' includes a pair of cross-drilled holes (not shown) having a common axis of symmetry and being positioned so as to enable axial alignment with cross-drilled hole 11a' in stanchion 11' when the same is inserted within cup 12b'.

In this embodiment a safety bolt, indicated generally at 30', is inserted through cup 12b' and stanchion 11' to retain the same in position. Safety bolt 30' includes a safety spring 31' as shown in FIG. 10.

Spring 31' is generally semicircular in configuration having a loop portion 31a' formed at either end thereof. Safety bolt 30' includes a head portion 30a' having a hole 30a" drilled therethrough wherein a loop portion 31a' of safety spring 31' may be inserted and permanently captured. An opposite end of the safety spring 31', also having a loop portion 31a' formed thereon, is snapped into position over the terminal end of safety bolt 30' which extends through cup 12b' and is spring-biased against cup 12b' in order to retain bolt 30' therein.

Since such safety bolts and safety springs are well known to those skilled in the art, further detailed discussion of the same is not deemed necessary.

In yet another alternative embodiment (not illustrated), anchor bracket 12' includes a cup 12b' having an internal bore 12c' that is provided with internal threads which are adapted to receive and engage a mating external thread formed at the lower end of stanchion 11' so as secure the same therein.

Since such internally threaded fittings are well known to those skilled in the art, further detailed discussion of the same is not deemed necessary.

Referring to FIG. 2 it will be appreciated that stanchion 11 is positioned at a predetermined location on anchor bracket 12 which is offset in a lateral direction from a center point 15 of the top surface of anchor bracket 12.

The above predetermined positioning of stanchion 11 on anchor bracket 12 in conjunction with the predetermined location of mounting apertures 12a in anchor bracket 12 is designed to gain a mechanical advantage in counteracting the potential force which could be exerted against horizontal side rails, indicated generally at 16, generated as a result of an adult or child falling against the same while moving through and around the building site thereby preventing serious bodily injury.

Still referring to FIG. 2, it will be appreciated that stanchion 11 has formed thereon an upper rail stop 17a and a lower rail stop 17b. Rail stops 17a and 17b are preferably fabricated as steel rings having an axial opening that is slightly larger than the outside diameter of stanchion 11. Upper rail stop 17a and lower rail stop 17b are disposed about the outside diameter of stanchion 11 and positioned at a predetermined vertical height generally corresponding to the vertical height of lower horizontal side rails 16b as shown in FIG. 2.

It will be more clearly seen by referring to FIG. 1, that upper rail stop 17a and lower rail stop 17b are disposed about stanchion 11 in perpendicular relation to the longitudinal axis thereof. Rail stops 17a and 17b are positioned in spaced relation from each other to accommodate the installation of at least two rail support collars 18 therebetween as clearly seen in FIGS. 1 and 2.

In the preferred embodiment, rail support collars 18 are also fabricated from steel having an axial opening that is somewhat larger than the outside diameter of stanchion 11 but smaller than rail stops 17a and 17b enabling collars 18 to be freely rotated 360 degrees about the longitudinal axis of stanchion 11.

Figure 3:
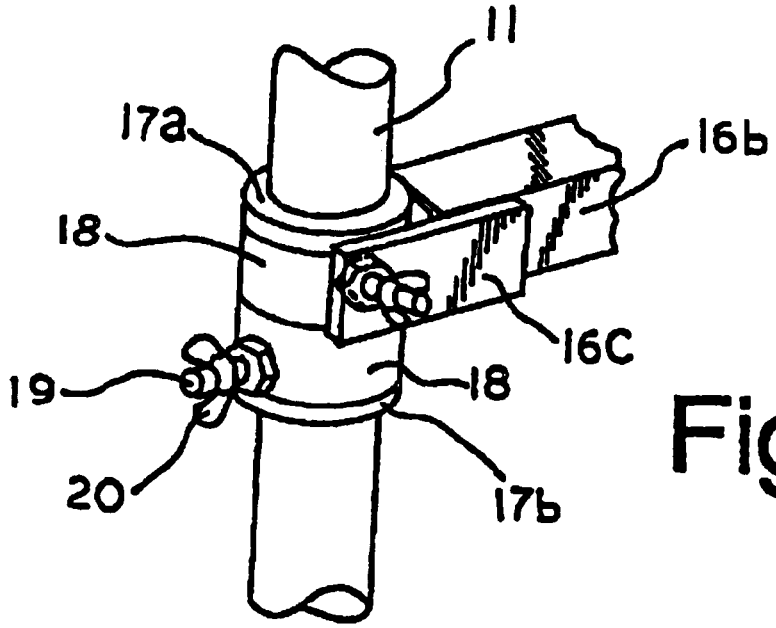
FIGS. 3 and 4 are enlarged perspective views of the pivoting collars for attaching the lower, horizontal side rails of the present invention.

Formed on the outside diameter of collars 18 are at least one threaded stud 19 extending outwardly therefrom in perpendicular relation to the longitudinal axis of stanchion 11 as shown in FIG. 3. In the embodiment shown, threaded studs 19 are fabricated from hexagonal steel stock and are attached to the exterior surface of collar 18 by weldment or other suitable means. There is also provided with each threaded stud 19 a wing nut 20 having cooperating threads for engaging therewith.

It will be understood that during the manufacturing process of stanchion 11 as shown in FIG. 3, rail stops 17a and 17b with at least two rail support collars 18 therebetween are slidably positioned at a predetermined location on stanchion 11. After the aforesaid components are precisely located in their operative positions, rail stops 17a and 17b are attached to stanchion 11 by weldment thereby permanently retaining collars 18. Collars 18 remain freely rotatable 360 degrees about the longitudinal axis of stanchion 11.

Figure 4:
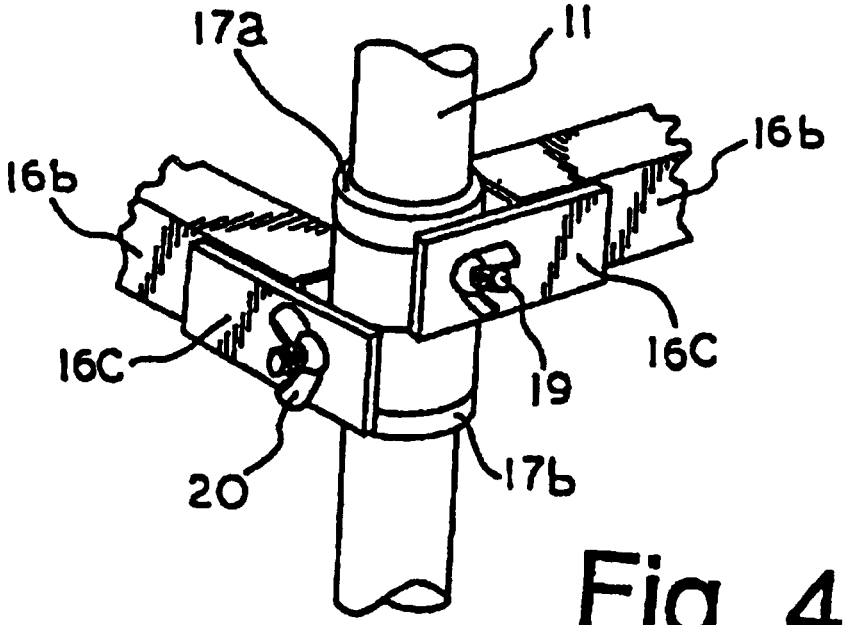

Referring now to FIG. 4, it can be seen that each end of lower horizontal side rails 16b includes a side rails extension bracket 16c that is attached in substantial linear alignment thereto by weldment. Side rail extension brackets 16c include at least one mounting aperture 16f through which threaded stud 19 may be inserted to mount lower horizontal side rails 16b in their functional position as shown in FIG. 4.

Wing nut 20, or other suitable fastener, may then be screwed into engagement with extension bracket 16c to secure lower horizontal side rail 16b in position.

It will be appreciated that lower side rail 16b may now be rotated in a horizontal plane or pivoted vertically to conform to the shape of the building structure where it will be deployed.

Figure 5:
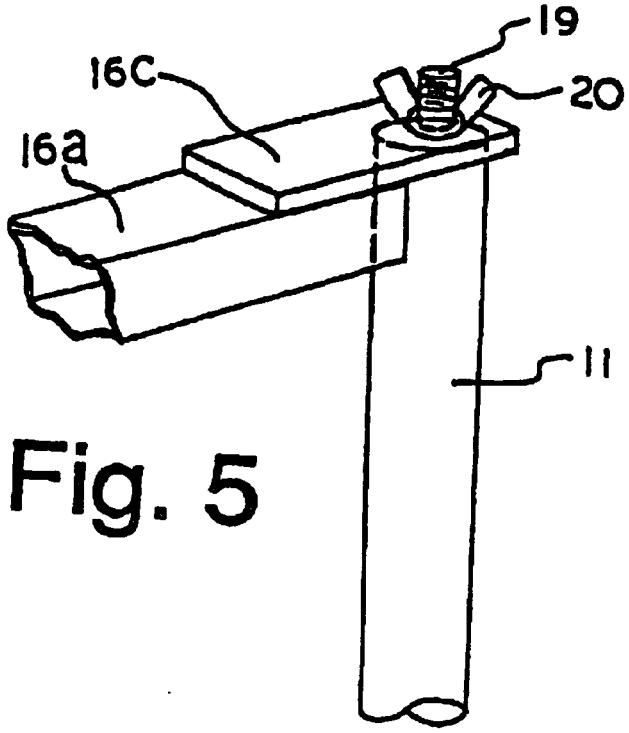
FIGS. 5 and 6 are enlarged perspective views of the top end of the upright stanchion showing the upper horizontal said rails attached thereto.

Now, turning to FIG. 5, there is shown the top end of upright stanchion 11 whereon an tipper horizontal side rail 16a is secured. It will be seen that the top end of stanchion 11 includes a threaded stud 19 that is integrally formed or otherwise fixed thereon. There is also provided with threaded stud 19 a wing nut 20 including cooperating threads therein.

It can also be seen that upper side rail 16a includes a side rail extension bracket 16c that is disposed in substantial linear alignment with upper side rail 16a and attached thereto by means such as weldment. Extension bracket 16c is provided with at least one mounting aperture 16f for locating extension bracket 1 6c on threaded stud 19 in its functional position.

Figure 6:
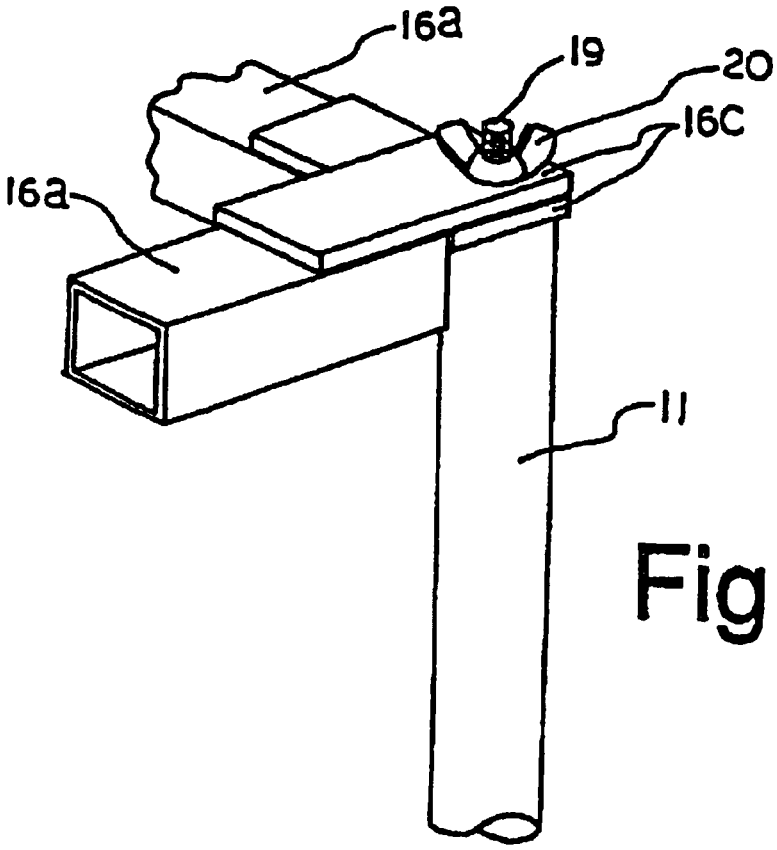

Referring now to FIG. 6, it will be appreciated that at least two side rail extension brackets 16c and their corresponding upper side rails 16a may be positioned on threaded stud 19 and secured in this position by engagement with wing nut 20.

It will be appreciated that upper horizontal side rails 16a may also be rotated 360 degrees in perpendicular relation to the longitudinal axis of stanchion 11 to conform to the shape of the building structure or construction site where it is to be utilized.

Figure 7:
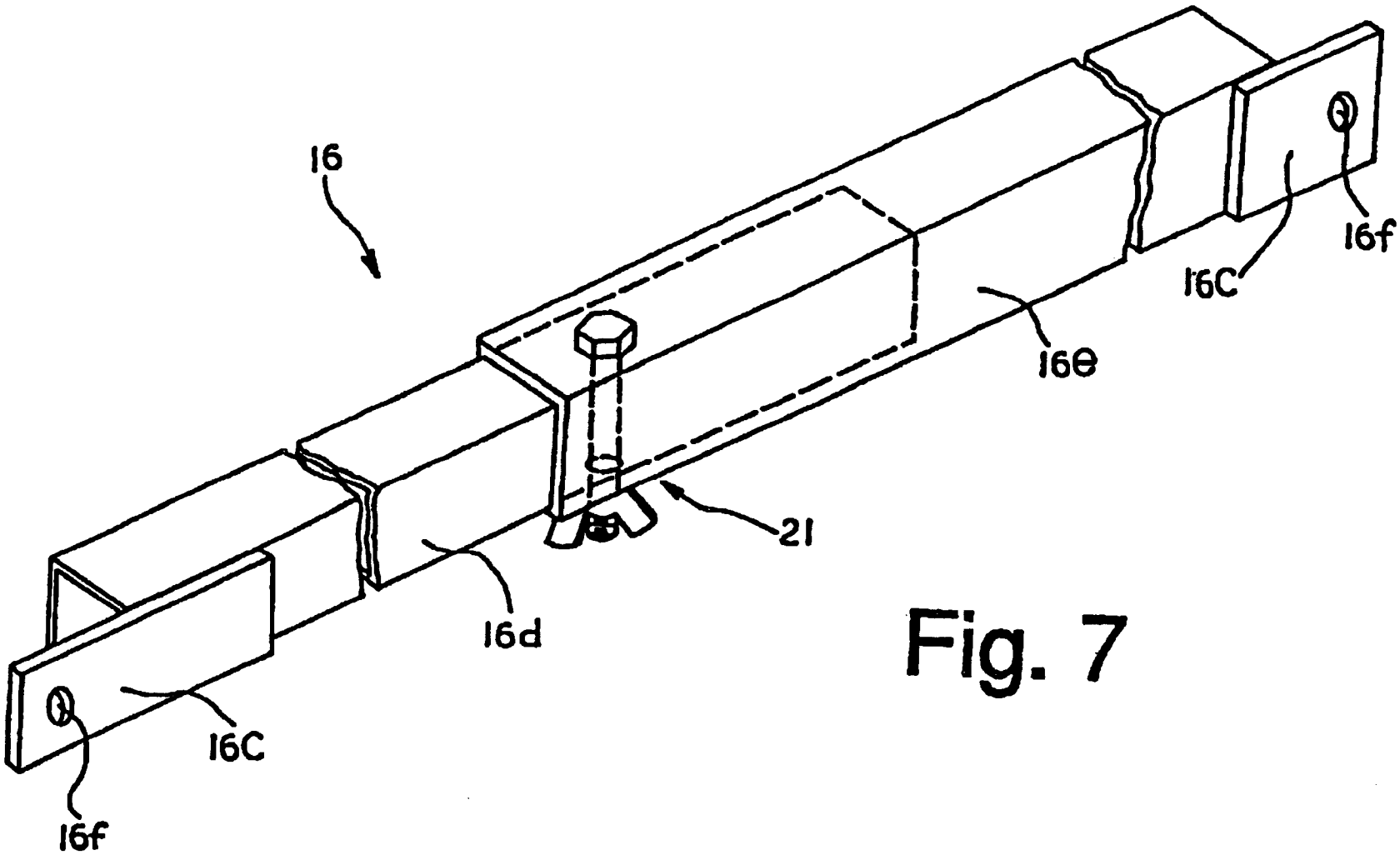
FIG. 7 is an enlarged perspective view of the telescoping segments comprising each respective side rail.

Now, turning to FIG. 7, there is shown therein a detailed view of the telescoping side rail of the present invention, indicated generally at 16. In the preferred embodiment, side rail 16 is composed of two individual segments, namely internal segment 6d and external segment 16e. It will be understood that both internal segment 16d and external segment 16e are fabricated from steel tubing that is generally rectangular in cross section. In particular, internal segment 16d is fabricated to an outside dimension that is slightly smaller than the inside dimension of external segment 16e.

Accordingly, internal segment 16d may be slideably engaged with the inside surface of external segment 16e in a telescoping manner. Hence, horizontal side rails 16 may be adjusted in length to conform to the dimensions of the building structure on the construction site where it is to be installed.

The telescoping ends of internal segment 16d and external segment 16e may be provided with a suitable locking means, such as that indicated generally at 21, for securing the telescoping side rial 16 in a fixed position after it has been adjusted to the desired length.

It is noteworthy that each respective telescoping side rail 16 as shown in FIG. 6 is manufactured to the same specifications and, thus, upper side rails 16a and lower side rials 16b are functionally interchangeable. The respective numerical designations herein are provided for purposes of clarification only.

Figure 11:
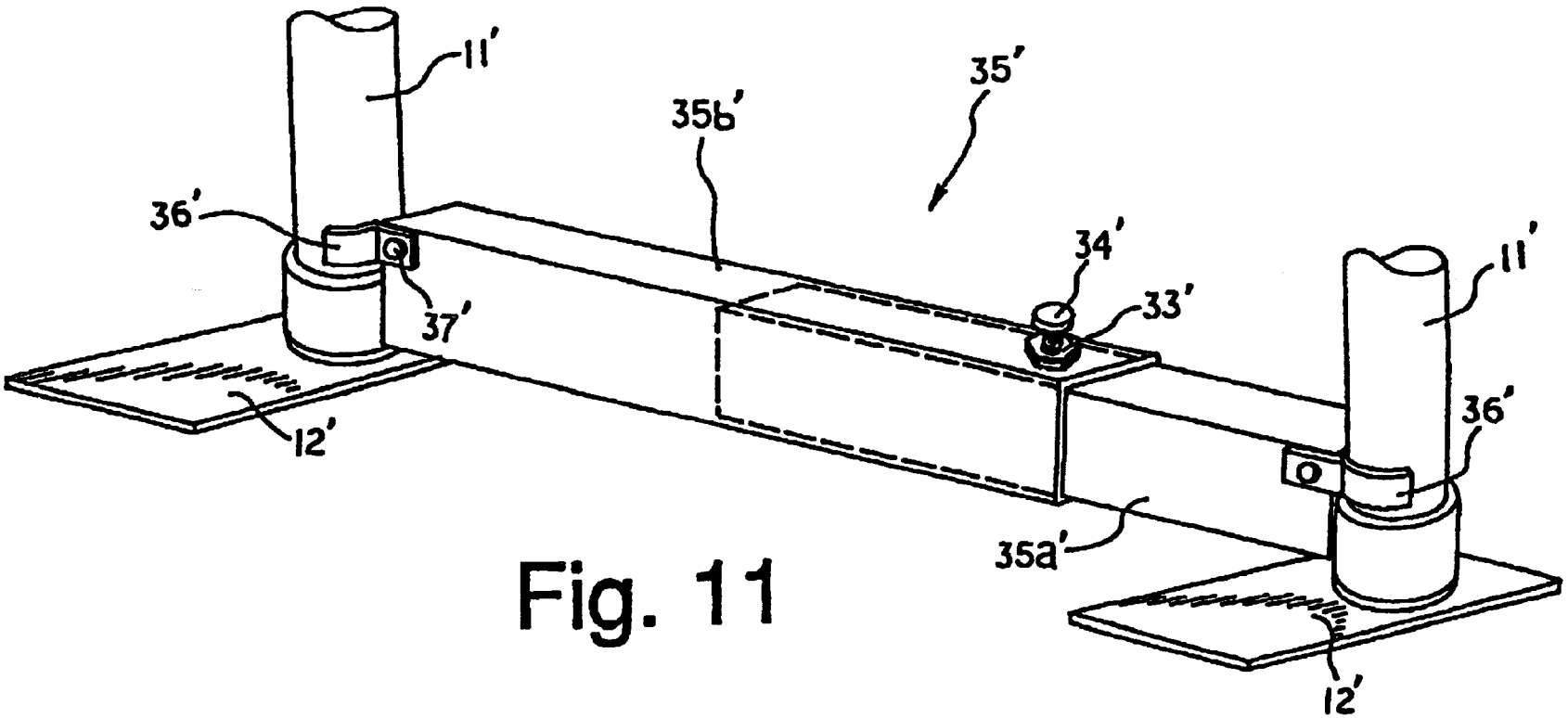
FIG. 11 is a perspective view of the toe board of the present invention installed on an upright stanchion.

Turning now to FIG. 11 there is shown therein a perspective view of the telescoping toe board of the present invention, indicated generally at 35'. In the preferred embodiment, toe board 35' is comprised of two individual sections, namely internal section 35a' and external 35b'. Both internal section 35a' and external section 35b' are fabricated from steel tubing that is generally rectangular in cross-section. In particular, internal section 35a is fabricated to an outside dimension that is slightly smaller than the inside dimension of external section 35b'.

Accordingly, internal section 35a' may be slidingly engaged wit the inside surface of external section of 35b' in a telescoping manner. Hence, the toe board 35' may be adjusted in length to conform to the dimensions of the building structure on the construction site in a manner similar to that of the telescoping side rails 16 of the present invention.

Internal section 35a' and external section 35b' may be provided with a suitable locking means, such as thumb screw 34' as shown in FIG. 11. Thumb screw 34' threadably engages mating nut 33' that is fixedly attached to an exterior surface of external section 35b' by weldment or other suitable means.

Thumb screw 34' is of sufficient length to extend through an aperture (not shown) formed in external section 35b' in alignment with nut 33' so as to secure internal member 35a' in a desired position after telescoping adjustment of the toe board 35'.

The opposite ends of internal member 35a' and external member 35b' are each provided with a semicircular yoke bracket, indicated generally at 36', which are adapted to engage upright stanchions 11' adjacent a lower end thereof as shown in FIG. 11. Yoke brackets 36' are secured in axial alignment with toe board 35' by machine screws 37' or other suitable fastening means.

In practical use, toe board 35' is positioned intermediate an adjacent pair of upright stanchions 11' and telescopingly adjusted to the required length and secured in position by thumb screw 34'. It will be appreciated that toe board 35' functions prevent tools and other materials from accidentally being pushed over the edge of the staircase or balcony whereon the temporary guard rail system is installed and onto persons below thereby preventing potential injury.

The toe board 35' is designed to withstand in excess of 50 pounds of outward pressure applied thereto in accordance with OSHA standards.

Figure 8:
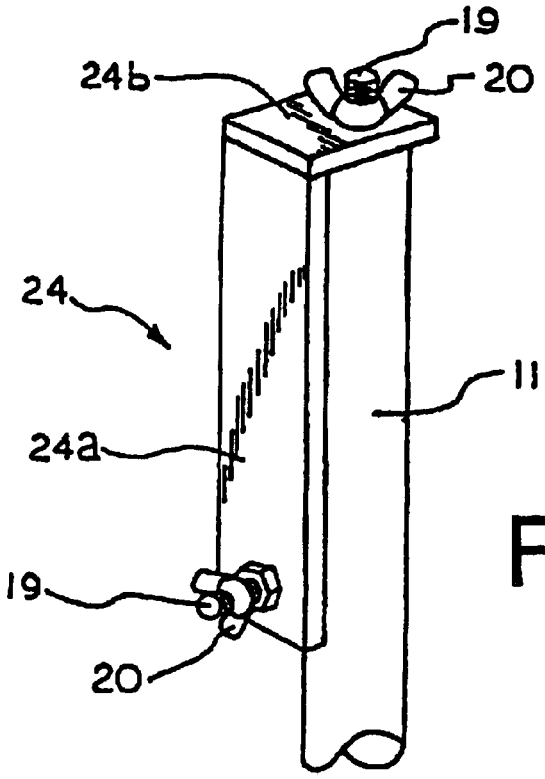
FIG. 8 is an enlarged perspective view of the top end of the upright stanchion showing an adapter for stair railings attached thereto.
Figure 9:
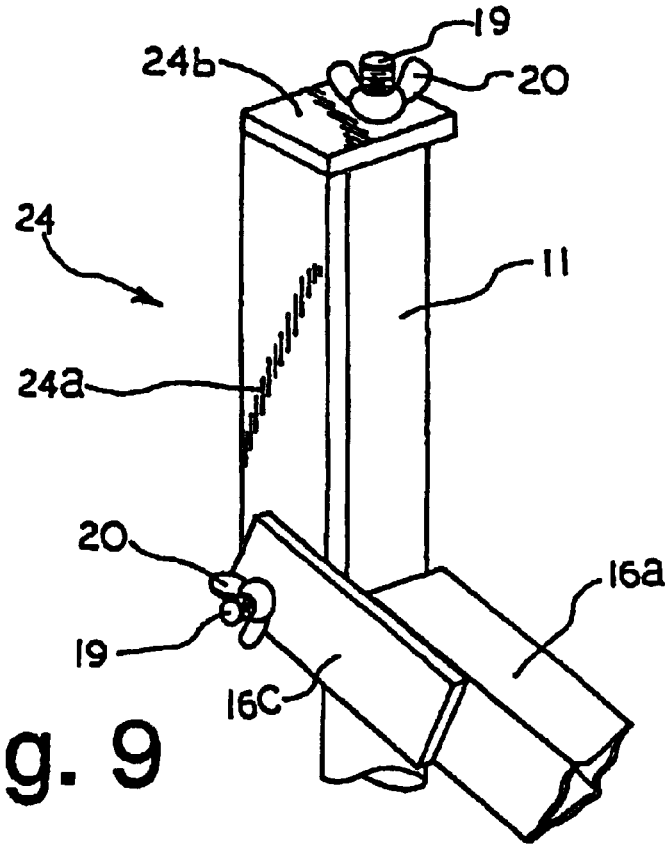
FIG. 9 is an enlarged perspective view of the top end of the upright stanchion showing the stair rail adapter of FIG. 8 having a stair railing attached thereto at an angle.

Referring now to FIG. 8, there is shown a stair adapter bracket, indicated generally at 24, designed to receive and support upper side rails 16a at varying angles in relation to upright stanchion 11 and particularly in those instances where the temporary guard rail system is utilized as a hand rail on a flight of stairs or other inclines.

Stair adapter bracket 24 is L-shaped, having a long member 24a and a short member 24b. In the preferred embodiment, stair adapter bracket 24 is fabricated from steel plate material and long member 24a is bent or attached in perpendicular relation to short member 24b by weldment.

Short member 24b is provided with a mounting aperture (not shown) at a predetermined location designed to receive threaded stud 19 that outwardly projects from the top of stanchion 11 such that long member 24a of stair adapter 24 is disposed in substantial parallel relation to the top of stanchion 11 as shown in FIG. 8.

There is also provided at the distal end of long member 24a a threaded stud 19 that is disposed in perpendicular relation to the plane defining member 24a. Threaded stud 19 is provided with a wing nut 20 having compatible threads therein.

In this particular application, anchor brackets 12 are attached to the treads of a convention flight of stairs or other inclines at various intervals. Upper side rails 16a are mounted on threaded stud 19 at the distal end of long member 24a of the stair adapter bracket 24. Wing nut 20 is screwed into engagement with side rail extension bracket 16c. Thereafter, the respective stanchions 11, each having a stair adapter bracket 24 installed thereon, are connected by a plurality of side rails 16a that extend from end to end down the flight of stairs or other inclines.

It will be appreciated that side rail extension bracket 16c is designed and fabricated to provide sufficient clearance between the end of upper side rail 16a and stair adapter bracket 24 to enable side rail 16a to be pivoted at varying angles to vertical without binding against adapter bracket 24.

It is understood that lower side rails 16b are designed and fabricated to enable this same pivoting movement at varying angles to vertical without special adaptation.

In order to facilitate the installation of the temporary guard rail system on a flight of stair or other inclines, various alternative embodiments of stair adapter bracket 24 are provided as illustrated in FIGS. 12-15.

Figure 12:
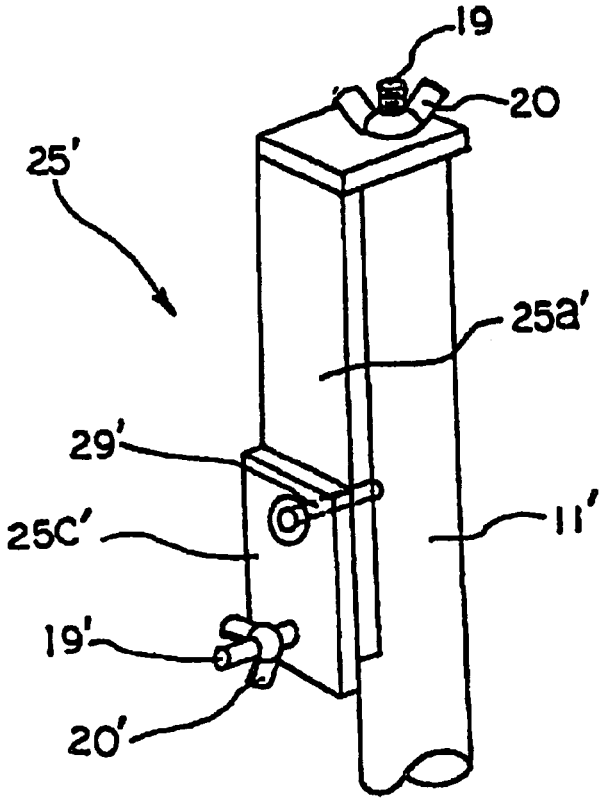
FIG. 12 is a perspective view of the one-way swivel bracket of the present invention for use on top of an upright stanchion.

Referring to FIG. 12 there is shown therein a one-way swivel bracket, indicated generally at 25', designed to receive and support upper side rails 16a at varying angles in relation to upright stanchion 11'. It will be appreciated that the one-way swivel bracket 25' is a modified version of the stair adapter bracket 24 as shown in FIG. 8. In this embodiment bracket 25' includes a swivel plate 25c' that is adapted for rotational movement about pivot pin 29' in a plane generally parallel to that of long member 25a' of bracket 25' as shown in FIG. 12.

Plate 25c' has mounted thereon a threaded stud 19' that projects outwardly therefrom in perpendicular relation to a plane defining plate 25c'. Threaded stud 19' is provided with a wing nut 20' having compatible threads therein.

It will be understood that the one-way swivel bracket 25' is intended for use on an upright stanchion 11' disposed at a terminal end of an assembled temporary guard rail system 10 whereon only one end of a guard rail 16 will be installed.

Figure 13:
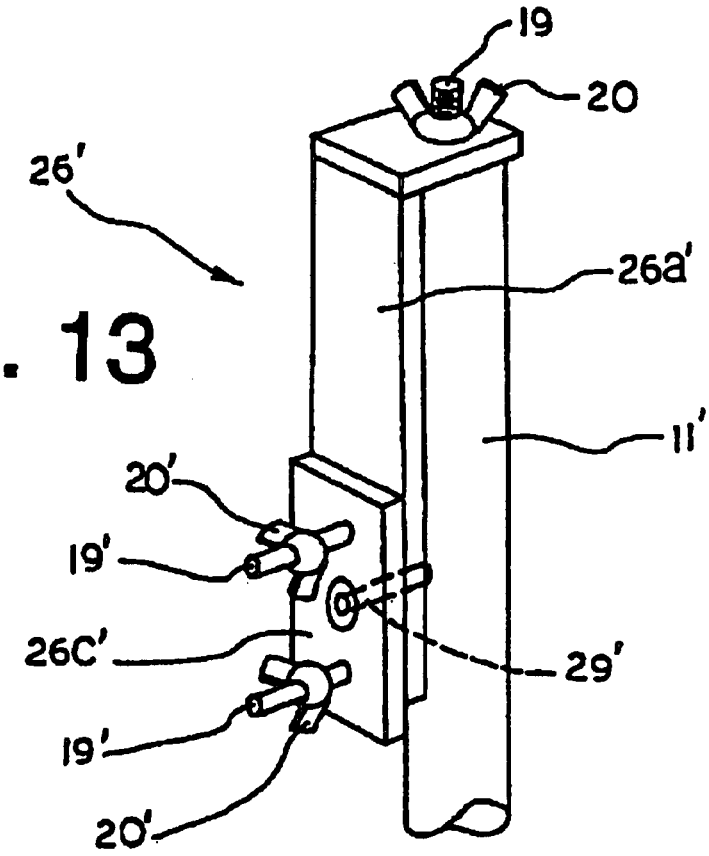
FIG. 13 is a perspective view of a two-way swivel bracket of the present invention for use on top of an upright stanchion.

Referring now to FIG. 13, there is shown therein a two-way swivel bracket, indicated generally at 26', designed for installation on the top end of an upright stanchion 11' wherein the same is disposed intermediate two adjacent upright stanchions 11' in an assembled temporary guard rail system 10.

Two-way swivel bracket 26' includes a swivel plate 26c' having a pair of threaded studs 19' installed thereon and extending outwardly therefrom in generally perpendicular relation thereto. It will be appreciated that pivot pin 29' is installed intermediate the two threaded studs 19' which are installed adjacent the ends of plate 26c' so as to provide a symmetrical pivoting movement thereof about pin 29'.

In this embodiment bracket 26' is adapted to receive the ends of two adjacent upper side rails 16a thereon.

Figure 14:
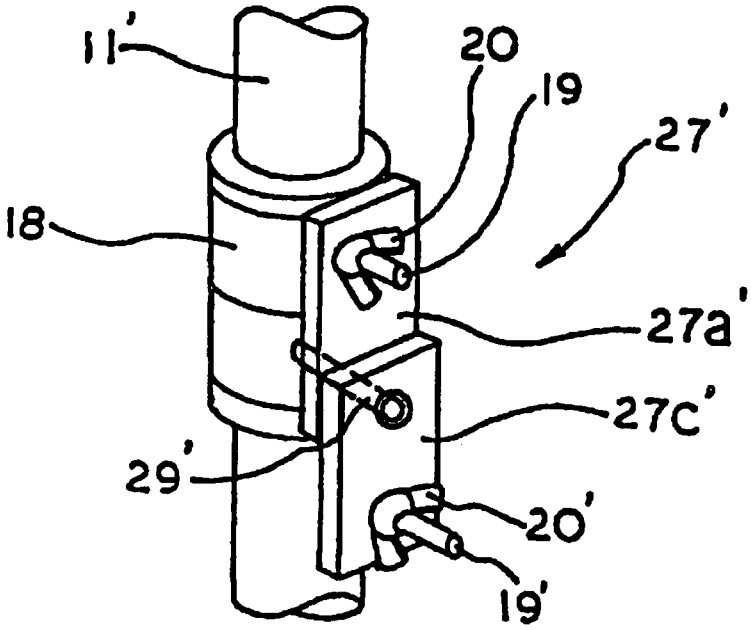
FIG. 14 is a perspective view of the one-way, mid-rail bracket of the present invention for use with a rail support collar.

Referring now to FIG. 14, there is shown therein a one-way mid-rail swivel bracket, indicated generally at 27'. It will be appreciated that the one-way mid-rail swivel bracket 27' is adapted for use on an upright stanchion 11' positioned at the terminal end of an assembled guard rial whereon it functions to receive only one end of a lower side rail 16b.

In the preferred embodiment, mid-rail swivel bracket 27' includes an elongated body member 27a' having an aperture (not shown) formed adjacent an end thereof for installation on a threaded stud 19 formed on rail support collar 18.

Bracket 27' includes a swivel plate 27c' which is pivotedly attached to body member 27a' by a pivot pin 29' imparting rotational movement thereto in a plane parallel to the plane defining member 27a'. Plate 27c' is provided with a single threaded stud 19' projecting outwardly therefrom in perpendicular relation thereto. Threaded stud 19' is provided with a wing nut 20' having compatible threads therein.

Figure 15:
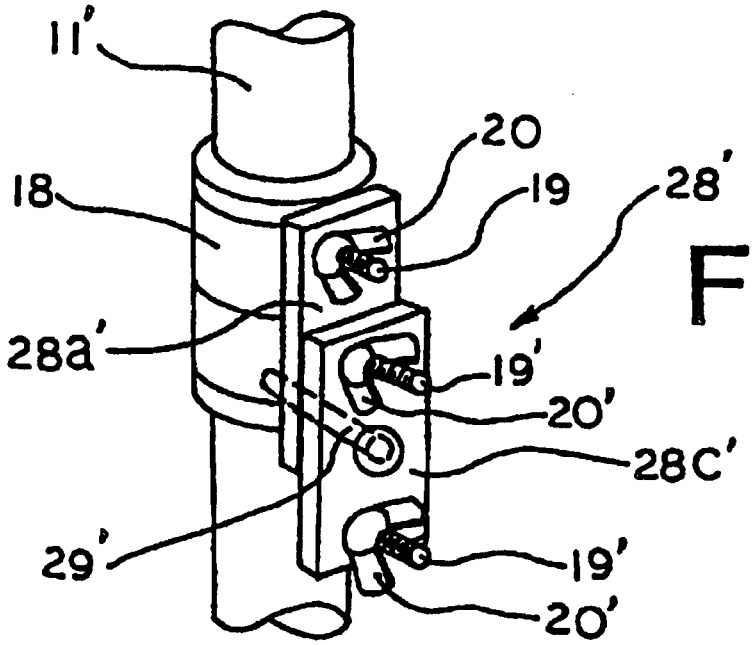
FIG. 15 is a perspective view of the two-way mid-rail bracket of the present invention for use with a rail support collar.

Turning now to FIG. 15 there is shown therein a two-way mid-rail swivel bracket, indicated generally at 28', designed for use on a stanchion 11' disposed intermediate two adjacent stanchions 11' in an assembled temporary guard rail system 10.

The two-way mid-rail swivel bracket 28' is adapted to receive the ends of two adjacent lower side rials 16b in maimer similar to that described hereinabove for the two-way swivel bracket 26'.

In this embodiment the bracket 28' includes an elongated rectangular member 28a' having an aperture (not shown) formed adjacent an end thereof for installation on a threaded stud 19 formed on rail support collar 18. Bracket 28' includes a swivel plate 28c' having a pair of outwardly projecting threaded studs 19' installed thereon in a symmetrical arrangement about a pivot pin 29'. Thus, plate 28c' is adapted for symmetrical movement about pivot pin 29' in a plane parallel to the plane defining elongated member 28a'.

In each of the above described alternative embodiments shown in FIGS. 12-15, the brackets, swivel plates and pivot pins are fabricated from steel or other suitable materials having sufficient strength to comply with OSHA standards for temporary guard rails.

Figure 16:
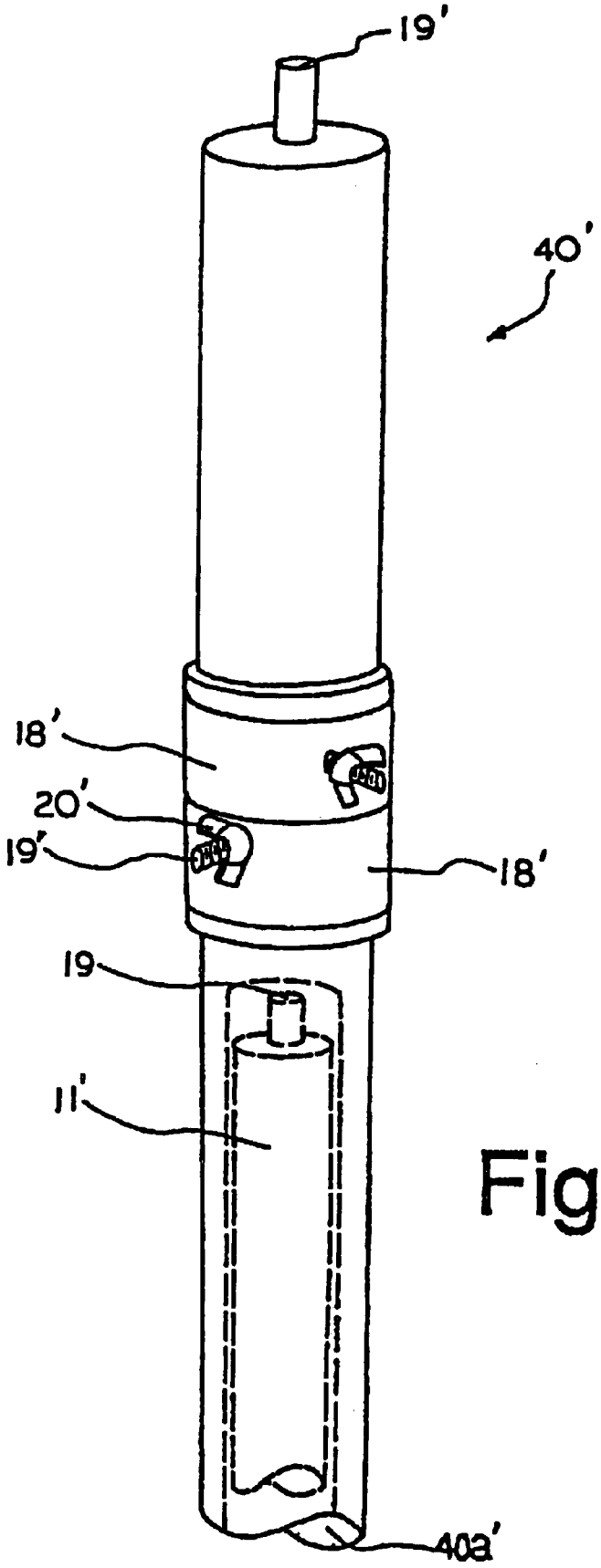
FIG. 16 is a perspective view of the guard rail extension post of the present invention.

Referring now to FIG. 16, there is shown therein a stanchion extension post, indicated generally at 40'. Extension post 40' functions to increase the vertical height of stanchions 11' to provide an increased measure of safety for employees working on ladders and stilts as required by OSHA regulations.

Figure 17:
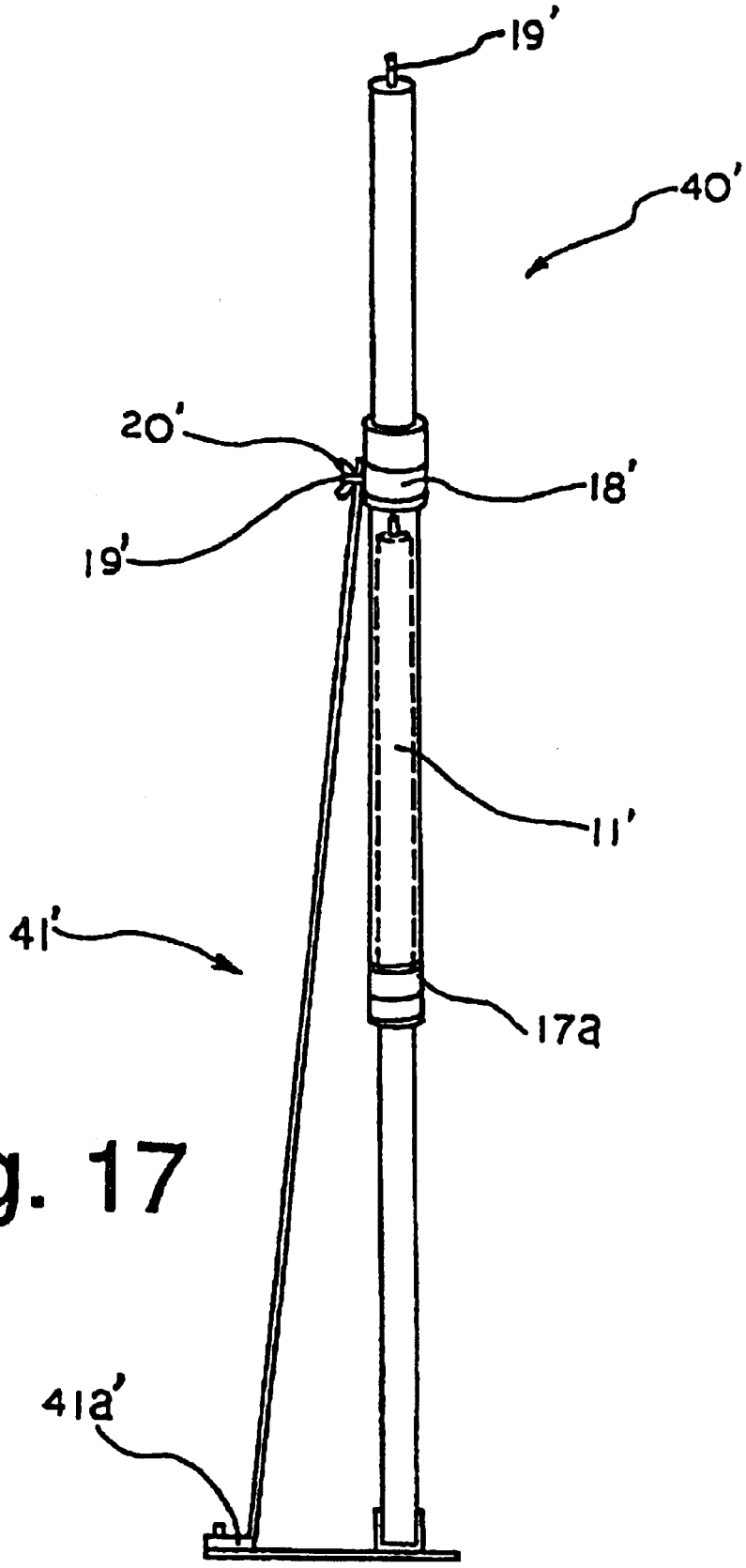
FIG. 17 is side elevational view of the guide post leverage strap of the present invention installed in its functional position.

Extension post 40' is similar in overall appearance and includes basically the same features as described hereinabove for stanchion 11. Extension post 40' differs from stanchion 11 with respect to its overall length which is approximately 24 inches. The extension post 40' includes an internal bore 40a' having an inside diameter which is slightly larger than the outside diameter of stanchion 11'. Thus, the extension post 40' is adapted to slide onto the upper end of stanchion 11' to effectively extend the vertical height thereof from 42 inches to approximately 54 inches. When installed in its functional position, the lower end of extension post 40' comes into positive contact with the upper rail stop 17a of stanchion 11' as shown in FIG. 17.

In order to attach the extension post 40' to an assembled temporary guard rail system 10, the upper side rials 16a are detached from their position at the top of stanchion 11' by removing wing nut 20 from threaded stud 19.

Next, the extension post 40' is disposed about the top of stanchion 11' such that the same slidingly engages internal bore 40a' and slides downwardly against the upper rail stop 17a of stanchion 11'.

Thereafter, upper side rail 16a is re-attached to collar 18' by engaging the same on threaded stud 19' with wing nut 20'.

Next an additional telescoping side rail (not shown) having features identical to side rails 16a and 16b as seen in FIG. 2 is installed at the top of extension post 40' on threaded stud 19' and secured thereto by wing nut 20'.

When installing extension post 40' on the first or last post in the temporary guard rail system which is unsupported by an adjacent stanchion 11', the use of a leverage strap, indicated generally at 41', as shown in FIG. 17 is required to meet OSHA standards. Leverage strap 41' comprises an elongated steel band having an aperture (not shown) at the top end thereof for installation on a threaded stud 19' integrally formed on collar 18' of extension post 40'.

Leverage strap 41' includes a base plate 41a' integrally formed thereto including a plurality of apertures (not shown) positioned at predetermined locations thereon so as to be aligned with apertures 12a formed in anchor bracket 12. Thus, the base plate 41a' of leverage strap 41 may be secured together with anchor bracket 12 by leg screws 14 to the building subfloor in order to support the extension post 40' in the above described configuration.

Figure 18:
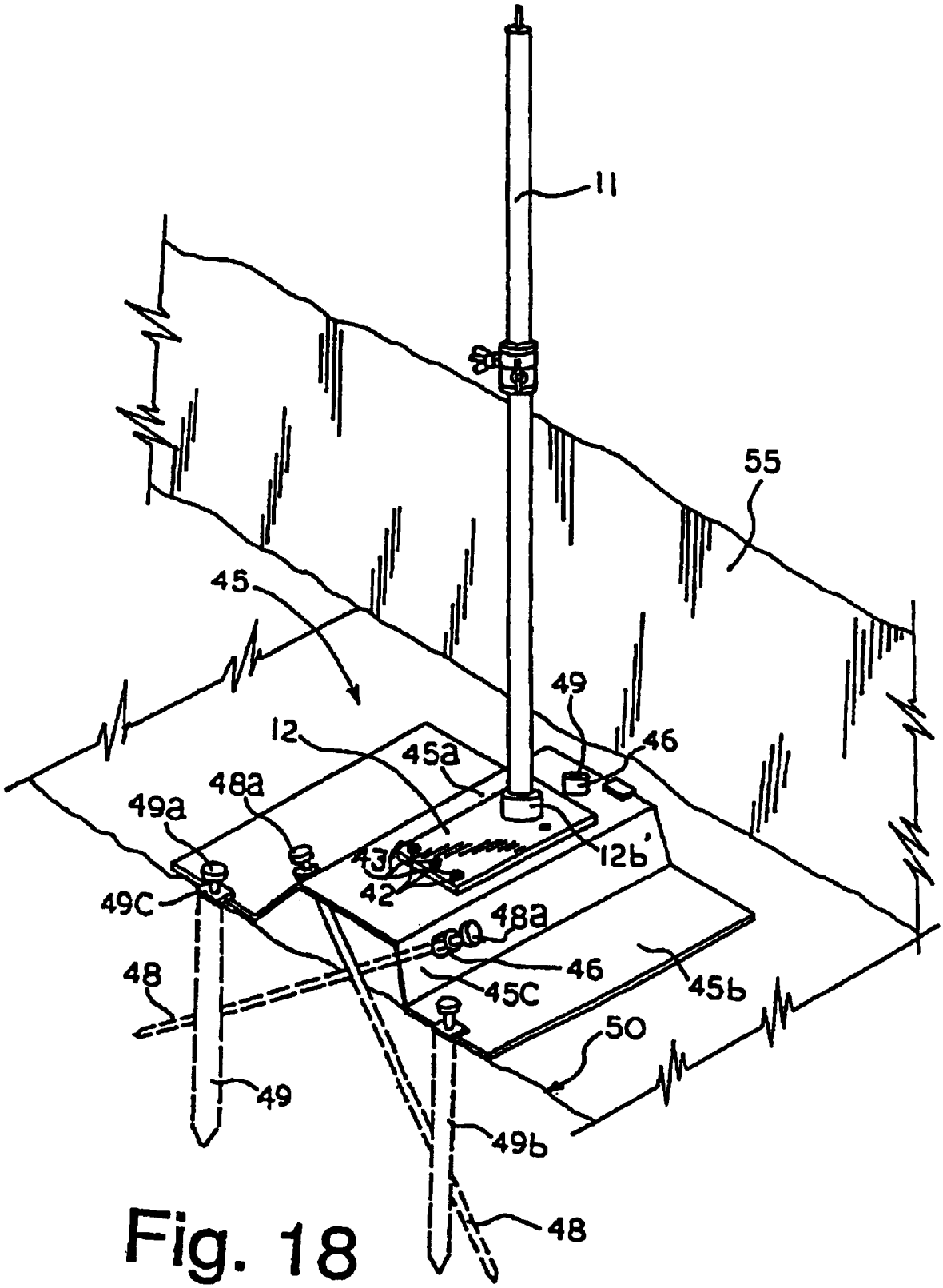
FIG. 18 is a perspective view of the ground plate adapter of the present invention.

In order to adapt the temporary guard rail system 10 of the present invention for use adjacent an open trench or other excavation site, anchor brackets 12 may be installed on a ground adapter plate as shown in FIG. 18 and indicated generally at 45. In the preferred embodiment, plate 45 is fabricated from a heavy gauge, corrugated sheet metal which is well known in the art. Such corrugated sheet metal is typically formed with alternating ridge positions 45a and valley portions 45b whcih are interconnected by upwardly tapered side wall portions 45c when viewed in cross-section.

Since such corrugated sheet metal is well known to those skilled in the art, further detailed discussion of the same is not deemed necessary, the preferred embodiment, the plate 45 is cut into approximately 18 inch squares for use in combination with the present invention. An anchor bracket 12 is mounted on the top surface of ridge ports 45a in axially alignment therewith at a predetermined location. Thereafter, anchor bracket 12 is secured in position by a plurality of self-tapping, sheet metal screws 42 which are threadedly secured in a plurality of pilot holes 43 formed therein in coaxial alignment thereto.

It will be understood that any embodiment of anchor bracket 12 described hereinabove is suitable for this installation.

Plate 45 is provided with a plurality of cylindrical, locating sleeves 46 which are positioned at predetermined locations thereon as shown in FIG. 18. Locating sleeves 46 are disposed in axial alignment with corresponding locating holes 47 formed in plate 45 in axial alignment therewith and being fixedly attached thereto by weldment or other suitable fastening means.

Each locating sleeve 46 is adapted to receive an anchor pin 48 which loosely penetrates the same and is driven into the ground or asphalt surface 50 adjacent the open trench 55 or other excavation site where the temporary guard rail system 10 is being installed.

In the preferred embodiment, anchor pins 48 are fabricated from elongated metal rods such as steel rods and measure approximately 36 inches in length. Anchor pins 48 include a head portion 48a integrally formed therewith and having a diameter that is larger than that of locating sleeves 46 so as to prevent it passing through the same when anchor pin 48 is driven into its functional position below the surface 50 by a sledge hammer (not shown) or other suitable tool.

In a similar manner, a plurality of anchor stakes 49 are utilized to secure the peripheral edges of plate 45 in place.

In the preferred embodiment, anchor stake 49 includes an elongated body member 49b that is T-shaped in cross-section. An upper end of body member 49b includes an outwardly projecting flange member 49c which functions to secure the peripheral edges of plate 45 in position after stake 49 has been driven into the ground 50. Stake 49 may be provided with a cylindrical head portion 49a being attached thereto by weldment so that it may be conveniently driven into the ground 50 by a hammer (not shown) or other suitable tool.

In the manner described hereinabove, a plurality of ground adapter plates 45 may be positioned about the perimeter of an open trench 55 or other excavation site at predetermined intervals so as to provide support for the installation of the temporary guard rail system 10 thereon.

It will be understood by those skilled in the art that the ground adapter plates 45 may also be installed on an asphalt surface such as a street or roadway adjacent a trench 55 or excavation site.

Figure 19:
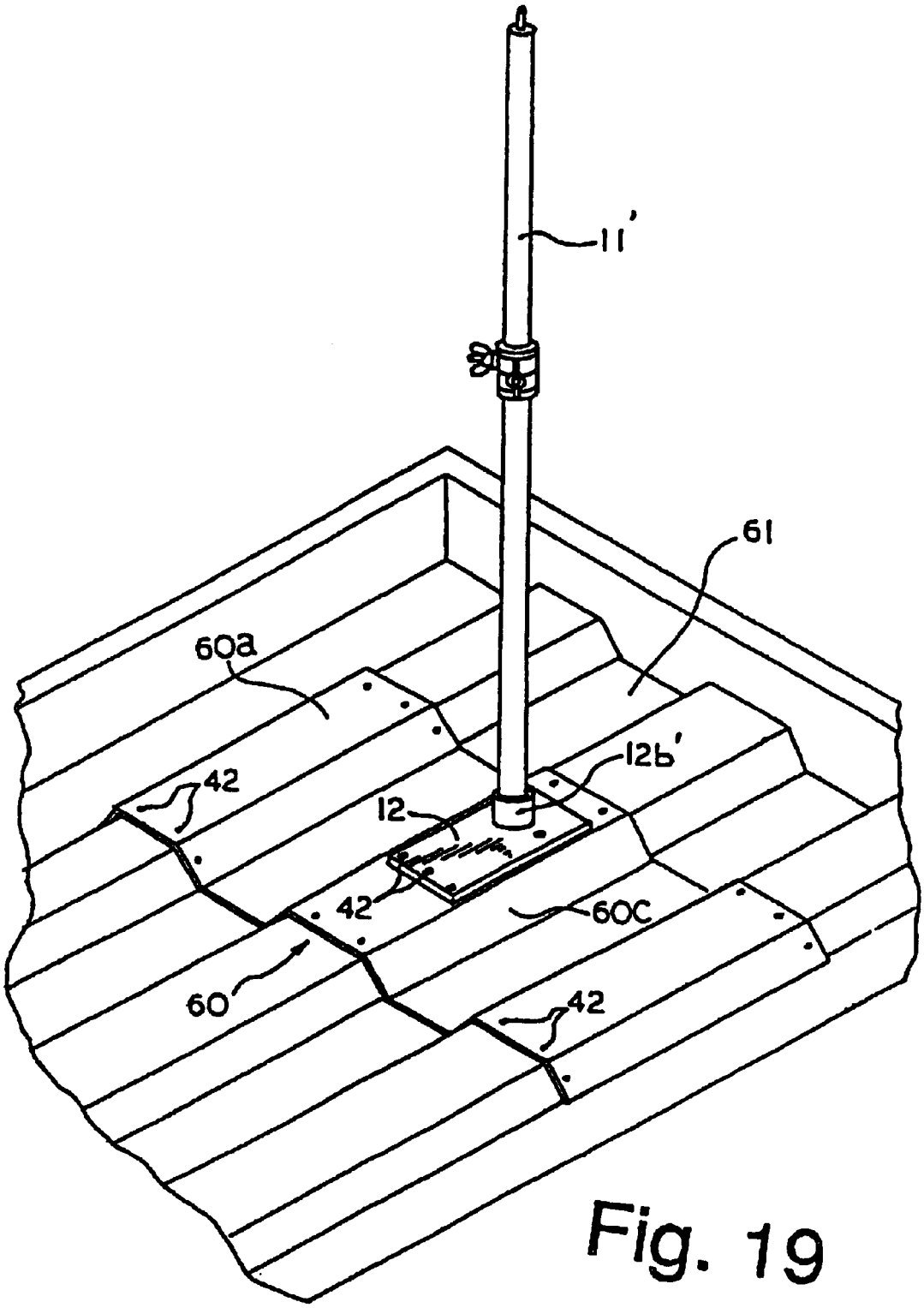
FIG. 19 is a perspective view of the roof plate adapter of the present invention.

In the construction of modem commercial buildings, panels of corrugated sheet metal are frequently utilized in the construction of the roof. In order to adapt the temporary guard rail system 10 to such a corrugated metal structure, a roof adapter plate, indicated generally at 60, is provided as shown in FIG. 19. In the preferred embodiment, the roof adapter plate 60 is fabricated from the same corrugated metal material used in the construction of the roof A panel of corrugated sheet metal is cut into approximately 18-inch squares. Thereafter, a plurality of such squares are stacked and secured together by weldment or other suitable fastening means.

In this configuration, roof adapter plate 60 may be positioned in the desired location on the surface of the roof 61 for installation as shown in FIG. 19.

Next, an anchor bracket 12 may be positioned thereon for attachment to the underlying roof 61 by a plurality of self-tapping sheet metal screws 42. The roof adapter plate 60 is further secured to the roof 61 by a plurality of self-tapping screws which are installed through the ridge portions 60a and the upwardly tapered side wall portions 60c thereof in predetermined locations.

It will be understood than in the roof installation described above, anchor bracket 12 is preferably of an embodiment having a cup 12b' including an internal bore 12c' having internal threads formed therein which are adapted to receive an externally threaded portion of stanchion 11 as previously described. After installation of the roof adapter plate 60, the construction of the roof 61 proceeds in the normal manner wherein a concrete slab is poured permanently capturing the plate 60 and anchor bracket 12 therein. Upon completion the threaded stanchion 11' may be threadably disengaged from the threaded anchor bracket 12' and the resulting void filled with a suitable cap or plug (not shown) wherein use of the temporary guard rail system is complete.

It will be appreciated by those skilled in the art that the roof adapter plate 60 may be retrofitted to pre-existing commercial buildings using the above described procedure by removing a portion of a pre-existing roof having a corrugated metal structure, matching the roof adapter plate 60 to the roof, installing the roof adapter plate with the attached anchor bracket 12' and patching the retrofitted area with a suitable roof material so as to capture the plate 60 therein.

It is reiterated that the temporary guard rail system 10 of the present invention has been designed and fabricated to comply with OSHA standards for temporary guard rails. From the above it can be seen that the present invention provides a temporary guard rail system that may be readily adapted to any feature of a building that is under construction to protect against the potential for serious bodily injury from falls particularly when the construction site is unsupervised.

The terms "upper", "lower", "side", "top", "bottom" and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. An improved temporary guardrail system for removable attachment to a building under construction including a plurality of upright stanchions, each respective stanchion having an anchor bracket on a bottom end thereof, said stanchions being connected by a plurality of vertically spaced upper and lower side rails and by toe board, the improvements comprising:

means for rotatably connecting said rails to said stanchions enabling each respective side rail to be rotated 360° about a longitudinal axis of each respective stanchion in a horizontal plane and each respective side rail to be pivoted at varying angles in a vertical plane, said connecting means including a first threaded stud outwardly projecting from a top end of said stanchions in substantially axial alignment therewith enabling each of said upper side rails to be rotatably mounted thereon at various angles, said upper side rails being pivoted in a vertical plane at varying angles by use of angulation means, said angulation means comprising a generally L-shaped swivel bracket disposed on said first threaded stud at said top end of said stanchion, said L-shaped bracket including a long leg portion and a short leg portion being fixedly attached in perpendicular relation thereto, said bracket further including swiveling means being adapted for pivoting movement in a plane parallel to the plane defining said long leg portion, said swiveling means including a second threaded stud disposed in perpendicular relation to said axis of said stanchion enabling said upper side rails to be mounted thereon and pivoted in a vertical plane at varying angles for installation of said temporary guardrail system on inclines such as stairs;

means for telescopically adjusting the length of each respective side rail and said toe board enabling said temporary guardrail system to be adapted to dimensional features of different buildings under construction; and means for selectively extending the vertical height of said guardrail system to provide an increased measure of safety for employees performing specialized tasks requiring ladders and stilts adjacent thereto.

2. The temporary guardrail system of claim 1 wherein said swiveling means includes a pair of said studs arranged in parallel, spaced-apart relation thereon, said studs being disposed in perpendicular relation to said axis of said stanchion enabling a pair of adjacent upper side rails to be mounted thereon and pivoted in a vertical plane at varying angles for installation of said temporary guardrail system on inclines such as stairs.

3. The temporary guardrail system of claim 1 wherein said connecting means for said lower side rails comprises at least one rail support collar cooperating with an angulation means attached to each of said side rails, said at least one rail support collar being disposed about said stanchion and having at least one threaded stud outwardly extending therefrom and being perpendicular to a center axis of said collar enabling said angulation means of said side rails to be fixedly mounted on said at least one threaded stud.

4. The temporary guardrail system of claim 3 wherein said angulation means of said side rails comprises a mid-rail, swivel bracket disposed on said on at least one threaded stud extending from said rail support collar, said mid-rail, swivel bracket including an elongated body member and further including swiveling means being adapted for pivoting movement in a plane parallel to the plane defining said elongated body member, said swiveling means of said mid-rail, swivel bracket including a threaded stud mounted in perpendicular relation to said axis of said stanchion enabling said lower side rails to be mounted thereon and pivoted in a vertical plane at varying angles for installation of said temporary guardrail system on inclines such as flights of stairs.

5. The temporary guardrail system of claim 4 wherein said swiveling means of said mid-rail, swivel bracket includes a pair of threaded studs arranged in generally parallel, spaced-apart relation enabling a pair of said lower side rails to be mounted thereon and pivoted in a vertical plane at varying angles for installation of said temporary guardrail system on inclines such as flights of stairs.

6. The temporary guard rail system of claim 3 herein a plurality of rail support collars are disposed about said stanchions at a pre-determined vertical location in an operative relationship between at least two rail stops.

7. The temporary guard rail system of claim 1 wherein said extending means includes a plurality of extension posts being adapted for sliding engagement about the outside diameter of said stanchions at the upper ends thereof, said extension posts including connecting means so as to permit attachment of a plurality of vertically spaced side rails thereon enabling the vertical height of said temporary guard rail system to be selectively extended to provide increased safety to employees performing specialized tasks adjacent thereto.

8. The temporary guard rail system of claim 1 wherein each respective stanchion is fixedly attache to a ground anchoring means for installation directly onto a ground surface adjacent an excavation site.

9. The temporary guard rail system of claim 8 wherein said ground anchoring means is fabricated from a heavy gauge, corrugated sheet metal material that is adapted to receive a plurality of anchor pins therethrough for securing said ground anchoring means directly to the surface of the ground.

10. The temporary guard rail system of claim 1 wherein each respective stanchion is adapted for installation on a roof anchoring means fabricated from corrugated sheet metal.

11. The temporary guard rail system of claim 10 wherein said roof anchoring means is matched to the configuration of said corrugated sheet metal used in the construction of a roof.

*12. A temporary guardrail system for removable attachment to a building under construction, the system comprising:*

*a plurality of upright stanchions;*

*an anchor bracket connected to a bottom end of each respective one of the plurality of stanchions;*

*a plurality of vertically spaced-apart side rails connected to each of the plurality of stanchions;*

*means for rotatably connecting said side rails to said stanchions enabling each respective side rail to be rotated about a longitudinal axis of each respective stanchion in a horizontal plane and each respective side rail to be pivoted at varying angles in a vertical plane, said connecting means comprising a first connector portion to rotatably mount each of said side rails on said stanchions at various angles; and*

*means for telescopically adjusting the length of each respective side rail enabling said temporary guardrail system to be adapted to dimensional features of different buildings under construction;*

*said connecting means for said side rails further comprising at least one rail support collar attached to each of said side rails, said at least one rail support collar being disposed about said stanchion and having at least one collar connecter portion to connect said side rails thereto.*

*13. The temporary guardrail system of claim 12, further comprising swiveling means for enabling a pair of adjacent side rails to be mounted on said stanchions and pivoted in a vertical plane at varying angles for installation of said temporary guardrail system on inclines.*

*14. The temporary guardrail system of claim 12, further comprising angulation means positioned to cooperate with said side rails, wherein said angulation means comprises a mid-rail swivel bracket disposed on said at least one collar connecter portion, said mid-rail swivel bracket including an elongated body member and further including swiveling means being adapted for pivoting movement in a plane parallel to the plane defining said elongated body member, said swiveling means of said mid-rail swivel bracket including a threaded stud mounted in perpendicular relation to said axis of said stanchion enabling said side rails to be mounted thereon and pivoted in a vertical plane at varying angles for installation of said temporary guardrail system on inclines.*

*15. The temporary guardrail system of claim 14, wherein said swiveling means of said mid-rail swivel bracket includes a pair of bracket connector portions to connect a pair of said side rails thereto to be pivoted in a vertical plane at varying angles for installation of said temporary guardrail system on inclines including flights of stairs.*

*16. The temporary guard rail system of claim 12, wherein a plurality of rail support collars are disposed about said stanchions at a pre-determined vertical location in an operative relationship between at least two rail stops.*

*17. The temporary guardrail system of claim 12, further comprising extending means for selectively extending the vertical height of said guardrail system of users performing specialized tasks using ladders and stilts adjacent thereto, wherein said extending means includes a plurality of extensions posts being adapted for sliding engagement about the outside diameter of said stanchions at upper ends thereof, said extension posts including connecting means for attaching a plurality of vertically spaced side rails thereon enabling the vertical height of said temporary guard rail system to be selectively extended.*

*18. The temporary guard rail system of claim 12, wherein each respective stanchion is fixedly attached to a ground anchoring means for installation directly onto a ground surface.*

*19. The temporary guard rail system of claim 18, wherein said ground anchoring means comprises a heavy gauge corrugated sheet metal material that is adapted to receive a plurality of anchor pins therethrough for securing said ground anchoring means directly to the surface of the ground.*

*20. The temporary guard rail system of claim 12, wherein said anchor bracket comprises a roof anchoring bracket comprising corrugated sheet metal.*

*21. The temporary guard rail system of claim 20, wherein said roof anchoring bracket is matched to a configuration of corrugated sheet metal of a roof.*

*22. A temporary guardrail system of removable attachment to a building under construction, the system comprising:*

*a plurality of upright stanchions;*

*an anchor bracket connected to a bottom end of each stanchion;*

*a plurality of telescoping side rails connected to each stanchion; and*

*a plurality of rail connectors to rotatably connect said side rails to said stanchions so that each respective side rail is rotatable about a longitudinal axis of each respective stanchion in a horizontal plane and each respective side rail is pivotable at varying angles in a vertical plane, each rail connector comprising*

*at least one rail support collar disposed about said stanchion,*

*a first connector portion on the at least one rail support collar, and*

*a second connector portion on a respective side rail to cooperate with the first connector to rotatably mount the respective side rail to the respective stanchion.*

*23. The temporary guardrail system of claim 22, further comprising a mid-rail swivel bracket on said at least one rail support collar to connect said side rails thereto to be pivoted in a vertical plane for installation of said temporary guardrail system on an incline.*

* * * * *